No. 823,859. PATENTED JUNE 19, 1906.
F. GRÖSCHE.
APPARATUS FOR SHAKING THERMOMETERS.
APPLICATION FILED FEB. 28, 1906.
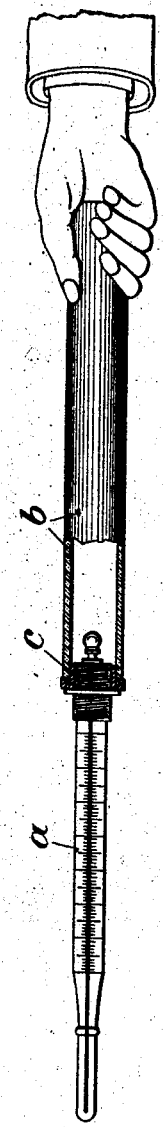
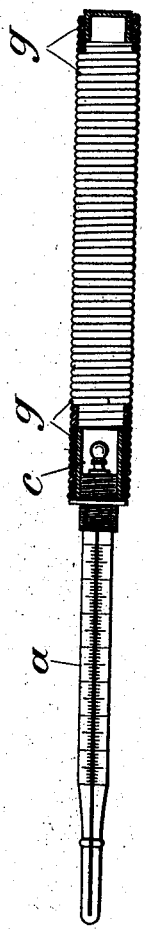
Witnesses:
Inventor
Friedrich Grösche

UNITED STATES PATENT OFFICE.

FRIEDRICH GRÖSCHE, OF ILMENAU, GERMANY.

APPARATUS FOR SHAKING THERMOMETERS.

No. 823,859.      Specification of Letters Patent.      Patented June 19, 1906.

Application filed February 28, 1906. Serial No. 303,476.

*To all whom it may concern:*

Be it known that I, FRIEDRICH GRÖSCHE, manufacturer, a subject of the Grand Duke of Saxe-Weimar-Eisenach, residing at Ilmenau, Grand Duchy of Saxe-Weimar-Eisenach, Germany, have invented certain new and useful Improvements in Apparatus for Shaking Thermometers, of which the following is a specification.

This invention relates to an apparatus for effecting the quick return of the mercury thread or column in maximum thermometers.

Figure 1 is a side view, partly in section, showing one form of the invention. Fig. 2 is a similar view illustrating a modification, and Fig. 3 also a similar view illustrating a still further modification.

The apparatus consists of a rod or tube to the front end of which is secured the thermometer, the said rod being throughout or in part of its length elastic in such manner that when the rod is moved in jerks or in the vertical plane the vibrations thus produced are transmitted to the front portion of the same in the form of multiplied vibrations or trepidations which act on the mercury column so that the latter is driven back in the mercury-cup.

It is preferable to make the protective socket or casing in which the thermometer is inclosed when it is not in use elastic in both of its portions. If this protective socket is made of elastic rubber, its elasticity will be sufficient in order to convert the "striking" movement into multiplied vibrations when striking down the thermometer screwed with its head into the socket. If the protective socket is made of metal plate, an elastic part, consisting of rubber, helical spring, or some other suitable material, can be inserted between the front screw portion of the socket and the back closed tubular portion, the said elastic part converting the movement produced by jerking the screwed-in thermometer in a vertical or nearly vertical plane into multiplied vibrations or trepidations. The whole protective socket or casing could also be made of helically-wound elastic steel wire.

Such a construction of apparatus according to this invention is illustrated, by way of example, in the accompanying drawings.

Fig. 1 shows the thermometer *a* screwed into a protective casing *b*, consisting of a rubber tube closed at the back end and containing in front the screw-union *c* for fixing the thermometer. When this socket is given a strong jerk in the vertical plane, the suitably thick protective socket vibrates and transmits the vibration given by the hand movement, multiplied many times, to the thermometer.

Fig. 2 shows a protective casing or socket of metal, the one portion *d* of which serves for screwing in the thermometer and is connected to the other closed tubular portion *e* by a helical spring *f*.

Fig. 3 shows the protective casing or socket *g*, made throughout of a helical wire and containing the screw-box *c* in its upper portion.

What I claim is—

1. An apparatus for shaking thermometers to effect the quick return of the mercury column, comprising an elastic socket member, and means for securing a thermometer therein.

2. An apparatus for shaking thermometers to effect the quick return of the mercury column, comprising a handle affording at one end an elastic portion, and means for securing a thermometer to said elastic portion.

3. An apparatus for shaking thermometers to effect the quick return of the mercury column, comprising a handle affording at its outer end an elastic portion, and a coupling member secured in said elastic portion and adapted to have the end of the thermometer secured therein.

4. An apparatus for shaking thermometers to effect the quick return of the mercury column, comprising an elastic handle, and means for securing a thermometer in one end thereof.

5. An apparatus for shaking thermometers to effect the quick return of the mercury column, comprising a socket member formed of a continuous helically-wound wire, and means for securing a thermometer in one end of said socket member.

In testimony whereof I have hereunto set my hand in presence of two subscribing witnesses.

FRIEDRICH GRÖSCHE.

Witnesses:
PAUL TEICHMANN,
ANNA B. SLOCUM.